(12) United States Patent
Bode et al.

(10) Patent No.: US 8,103,498 B2
(45) Date of Patent: Jan. 24, 2012

(54) PROGRESSIVE DISPLAY RENDERING OF PROCESSED TEXT

(75) Inventors: Andreas Bode, Bellevue, WA (US); Sandor Loren Maurice, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1149 days.

(21) Appl. No.: 11/865,284

(22) Filed: Oct. 1, 2007

(65) Prior Publication Data
US 2009/0043563 A1 Feb. 12, 2009

Related U.S. Application Data

(60) Provisional application No. 60/955,041, filed on Aug. 10, 2007.

(51) Int. Cl.
*G06F 17/28* (2006.01)
*G06F 17/24* (2006.01)
*G06F 17/21* (2006.01)
*G06F 17/20* (2006.01)

(52) U.S. Cl. ............... 704/3; 704/2; 715/256; 715/271; 715/273

(58) Field of Classification Search .................. None
See application file for complete search history.

(56) References Cited

U.S. PATENT DOCUMENTS

| | | |
|---|---|---|
| 5,175,684 A | 12/1992 | Chong |
| 5,251,130 A * | 10/1993 | Andrews et al. ................ 704/3 |
| 5,852,798 A | 12/1998 | Ikuta et al. |
| 5,987,402 A | 11/1999 | Murata et al. |
| 6,047,252 A | 4/2000 | Kumano et al. |
| 6,415,249 B1 | 7/2002 | Blakely et al. |
| 6,424,983 B1 * | 7/2002 | Schabes et al. ............... 715/257 |
| 6,785,675 B1 | 8/2004 | Graves et al. |
| 7,130,792 B2 | 10/2006 | Tokieda et al. |
| 7,389,222 B1 * | 6/2008 | Langmead et al. ............... 704/2 |

(Continued)

FOREIGN PATENT DOCUMENTS

JP 2003-196279 A 7/2003

OTHER PUBLICATIONS

International Search Report and Written Opinion Received for PCT Application No. PCT/US2008/072568, mailed on Feb. 27, 2009, 11 pages.

(Continued)

*Primary Examiner* — Matthew Sked
(74) *Attorney, Agent, or Firm* — Capitol City TechLaw; Richard C. Irving

(57) ABSTRACT

A method and a system are provided for processing displayed text and progressively displaying results of processing the displayed text. In some embodiments, displayed text may be submitted as processing requests to process portions of the displayed text. The processing may include translation of the portions of the displayed text from a source natural language to a target natural language, grammar checking of the portions of the displayed text, or other types of processing. Each of the processing requests may include one or more complete sentences, or other units of text. Further, each of the processing requests may be submitted independently of receiving a processing response corresponding to an immediately preceding submitted processing request. Changed or annotated text included in processing responses may replace corresponding displayed text.

20 Claims, 8 Drawing Sheets

U.S. PATENT DOCUMENTS

| | | | |
|---|---|---|---|
| 7,403,888 B1 * | 7/2008 | Wang et al. | 704/2 |
| 2001/0018649 A1 | 8/2001 | Kasai et al. | |
| 2002/0040292 A1 | 4/2002 | Marcu | |
| 2002/0169592 A1 * | 11/2002 | Aityan | 704/2 |
| 2003/0061022 A1 * | 3/2003 | Reinders | 704/2 |
| 2003/0200078 A1 | 10/2003 | Luo et al. | |
| 2003/0212962 A1 | 11/2003 | Chin et al. | |
| 2004/0260535 A1 | 12/2004 | Chen et al. | |
| 2007/0130563 A1 | 6/2007 | Elgazzar et al. | |
| 2007/0294076 A1 * | 12/2007 | Shore et al. | 704/2 |
| 2008/0077384 A1 * | 3/2008 | Agapi et al. | 704/2 |

OTHER PUBLICATIONS

"Development of Japanese-English, English-Japanese Conversation System with Voice Reading and Machine Translation", pp. 1-4.

Yang et al., "Automatic Detection and Translation of Text from Natural Scenes", Interactive Systems Laboratory, Carnegie-Mellon University, Pittsburg, pp. 4.

"Machine Translation for the Sphere", AppTek Inc., pp. 2.

* cited by examiner

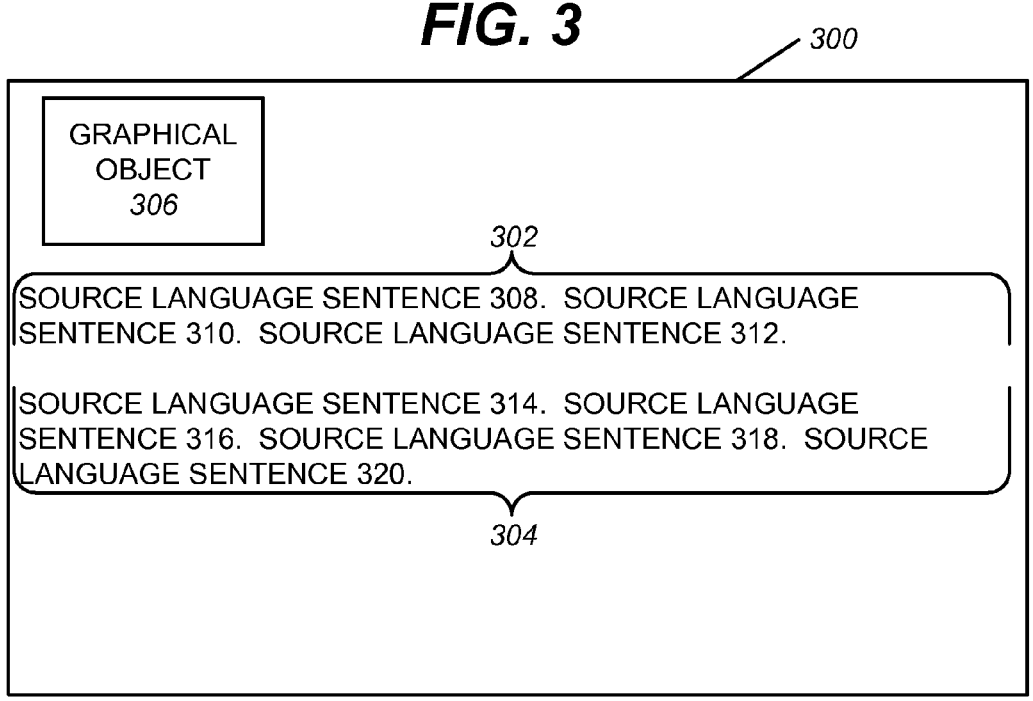
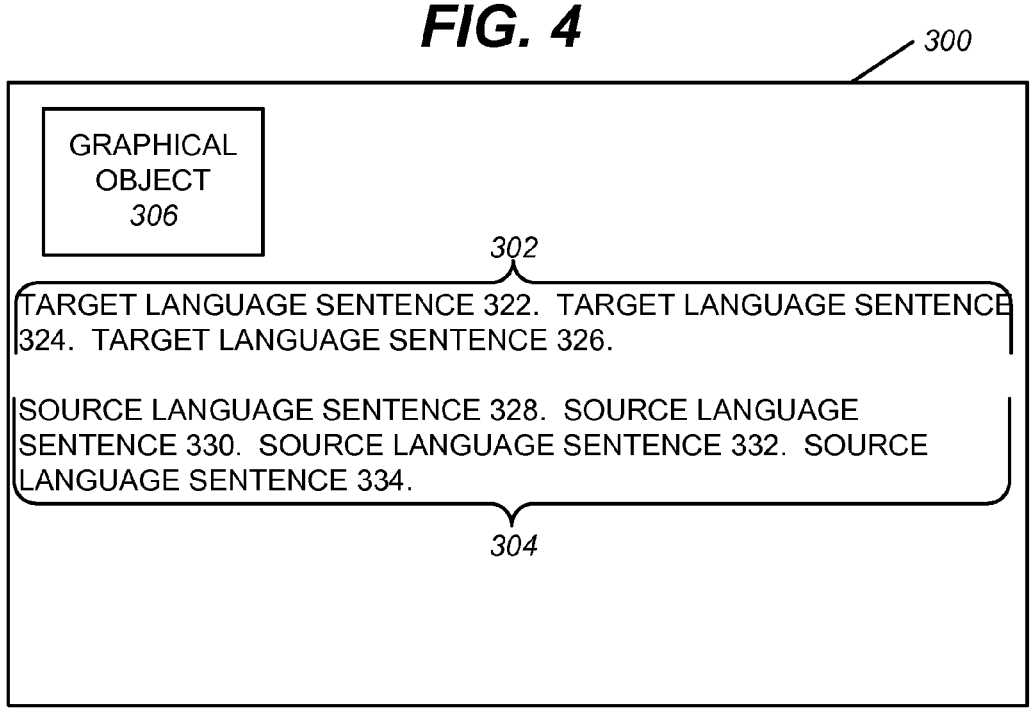

```
  ┌─────────────────────────────────────────────────┐ ╱ 600
  │                                                 │
  │ SENTENCE 602 (144 CHARACTERS).  SENTENCE 604 (126│
  │ CHARACTERS.  SENTENCE 606 (15 CHARACTERS). SENTENCE 608│
  │ (150 CHARACTERS).                               │
  │                                                 │
  │ SENTENCE 610 (26 CHARACTERS).  SENTENCE 612 (94 │
  │ CHARACTERS)  SENTENCE 614 (30 CHARACTERS). SENTENCE 616│
  │ (80 CHARACTERS).  SENTENCE 618 (100 CHARACTERS).│
  │                                                 │
  │                                                 │
  │                                                 │
  └─────────────────────────────────────────────────┘
```

FIG. 6

PROGRESSIVE DISPLAY RENDERING OF PROCESSED TEXT

This application claims the benefit of U.S. Provisional Patent Application No. 60/955,041, entitled, "Progressive Display Rendering of Machine-Translated Text", filed in the U.S. Patent and Trademark Office on Aug. 10, 2007.

BACKGROUND

Processing of text, such as, machine translation of text from one natural language to another, as well as other types of processing, may be time-consuming. For example, in many existing systems for performing machine translation of text, textual content of a document or file may be submitted for machine translation as a single request. If the document or file is large, translation may take several minutes, or longer, to complete.

In one system, in which displayed text may be display rendered progressively, textual content of portions of a document or file may be submitted for machine translation as separate translation requests. However, only one translation request may be outstanding at any time. That is, after sending a translation request, the system waits for a corresponding response to the translation request before submitting a subsequent translation request.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

In embodiments consistent with the subject matter of this disclosure, a portion of displayed textual content of a document may be submitted for processing, such that multiple processing requests may be submitted independently of receiving a corresponding processing response to an immediately preceding submitted processing request. The document may include a file having textual content, such as, for example, a hypertext markup language (HTML) file, a word processing file, or other file. Each of the processing requests may include a unit of text. The unit of text may include one or more complete sentences, or another grouping of the text. Processing responses, corresponding to the submitted processing requests, may include changed or annotated text corresponding to ones of the processing requests. The changed or annotated text, included in respective ones of the processing responses, may replace corresponding displayed text as respective ones of the processing responses are received, without changing a formatting of the displayed textual content. The processing requests may include requests for machine translation of a respective unit of text, grammar checking and/or spellchecking of the respective unit of text, or other processing of the respective unit of text.

DRAWINGS

In order to describe the manner in which the above-recited and other advantages and features can be obtained, a more particular description is described below and will be rendered by reference to specific embodiments thereof which are illustrated in the appended drawings. Understanding that these drawings depict only typical embodiments and are not therefore to be considered to be limiting of its scope, implementations will be described and explained with additional specificity and detail through the use of the accompanying drawings.

FIGS. 3 and 4 illustrate exemplary display screens in embodiments consistent with the subject matter of this disclosure.

FIG. 6 illustrates an exemplary display screen for use in explaining optimization of determining units of text to be included in respective processing requests.

DETAILED DESCRIPTION

Figure 1:
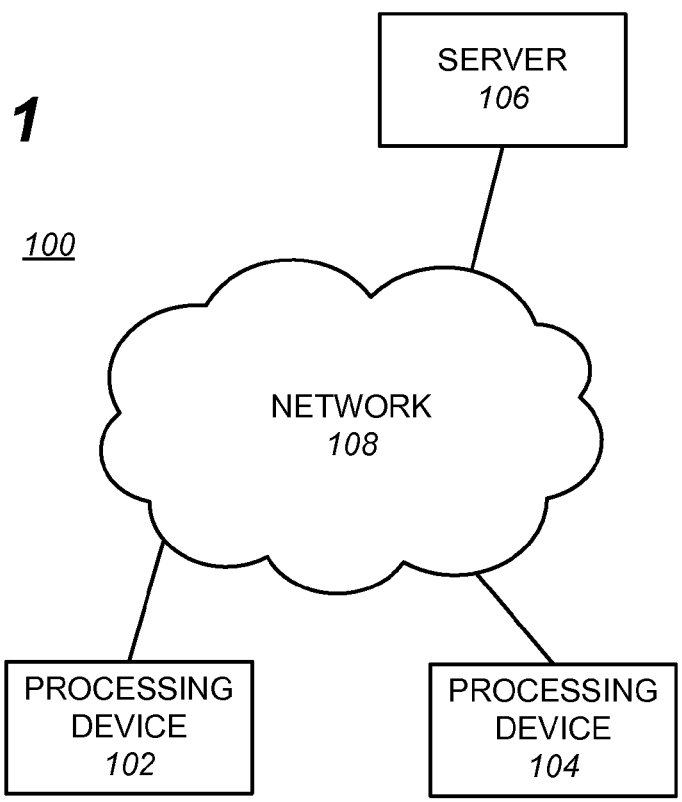
FIG. 1 illustrates an exemplary operating environment for embodiments consistent with the subject matter of this disclosure.

Embodiments are discussed in detail below. While specific implementations are discussed, it should be understood that this is done for illustration purposes only. A person skilled in the relevant art will recognize that other components and configurations may be used without parting from the spirit and scope of the subject matter of this disclosure.

Overview

In embodiments consistent with the subject matter of this disclosure, a processing device may display a textual document including text in a natural language, such as, for example, English, French, German, or other natural language. For the purposes of this disclosure, a textual document may include a file having textual content, such as, for example, a hypertext markup language (HTML) file, a word processing file, or other file. Thus, embodiments consistent with the subject matter of this disclosure may include a web browser, such as, for example, Internet Explorer®, available from Microsoft Corp., or another browser, a word processing application, such as, for example, Microsoft Word, available from Microsoft Corp., or another word processing application, or any other application which displays textual content on a display of a processing device.

In various embodiments consistent with the subject matter of this disclosure, textual content may be displayed on a display screen of a processing device. A user may request machine translation of the displayed textual content from a source language, such as, for example, English, or another natural language, to a target language, such as, for example, French, or another natural language. Displayed content may also include non-textual items, such as, for example, images, graphics, or other non-textual items.

Multiple translation requests, including portions of the displayed textual content, may be submitted for machine translation. Each of the translation requests may include a unit or text, such as, for example, a chunk of text, or other unit. In one embodiment, each chunk may include complete sentences of text. For example, a chunk may include one complete sentence, two complete sentences, or any other number of complete sentences of text. The translation requests may be transmitted asynchronously. For example, each of the translation requests may be transmitted without waiting for a translation response corresponding to an immediately preceding translation request. In some embodiments, up to a predetermined number of translation requests may be outstanding. The predetermined number may be based on a number of factors including, for example, a number of processing devices performing translations, a speed of machine translation, and a desired type of user experience. If the predetermined number is too large, too much time may be spent translating text in which a user is no longer interested and progressive display rendering may appear to hiccup or stall. If the predetermined number is too small, too much time may be spent on computational/communicational overhead for each translation request resulting in overall performance degradation.

As translation responses are received, translated text in a target language may replace corresponding displayed text in a source language.

In variations of the above-mentioned embodiments, a processing device may display a textual document. The textual document may include a file having textual content, such as, for example, a hypertext markup language (HTML) file, a word processing file, or other file. Portions of the displayed textual content may be submitted as processing requests, such as, for example, grammar checking requests, or other processing requests. Each of the requests may include a chunk of text, including one or more complete sentences, or another unit of text. The processing requests may be transmitted asynchronously. As an example, each of the processing requests may be transmitted without waiting for a processing response corresponding to an immediately preceding processing request. In some embodiments, up to a predetermined number of processing requests may be outstanding. The predetermined number may be based on a number of factors including, for example, a desired user experience, a speed of processing, a number of processing devices performing the processing, and/or other factors.

As processing responses are received, processed text, which may include changed or annotated text, may replace corresponding displayed text on a display screen of the processing device.

Exemplary Operating Environment

FIG. 1 illustrates an exemplary operating environment 100 for embodiments consistent with the subject matter of this disclosure. Operating environment 100 may include processing devices 102, 104, one or more servers 106, and a network 108.

Network 108 may be a single network or a combination of networks, such as, for example, the Internet or other networks. Network 108 may include a wireless network, a wired network, a packet-switching network, a public switched telecommunications network, a fiber-optic network, other types of networks, or any combination of the above.

Processing devices 102, 104 may each be a user's processing device, such as, for example, a desktop personal computer (PC), a laptop PC, a handheld processing device, or other processing device.

Server 106 may be a processing device or a group of processing devices configured to work together. In embodiments in which server 106 includes a group of processing devices, the processing devices may be configured as a server farm.

Operating environment 100 is exemplary. Other operating environments may have more or fewer components. For example, other operating environments may have more or fewer processing devices, more or fewer servers, and one or more other networks of different types.

Exemplary Processing Device

Figure 2:
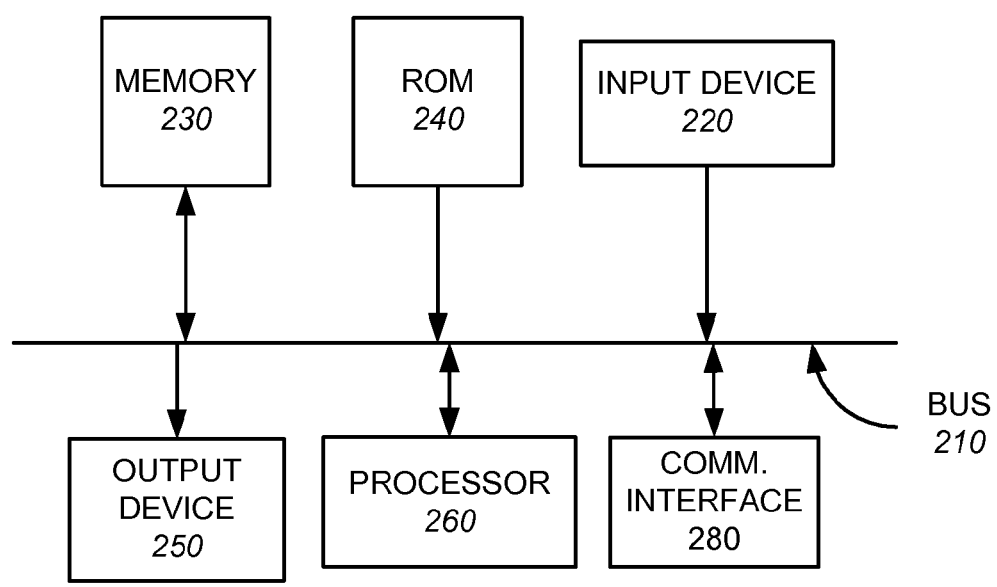
FIG. 2 is a functional block diagram of a processing device, which may be used to implement a server or a processing device shown in FIG. 1.

FIG. 2 is a functional block diagram that illustrates an exemplary processing device 200, which may be used to implement embodiments of processing devices 102, 104 and/or server 106 consistent with the subject matter of this disclosure.

Processing device 200 may include a bus 210, an input device 220, a memory 230, a read only memory (ROM) 240, an output device 250, a processor 260, and a communication interface 280. Bus 210 may permit communication among components of processing device 200.

Processor 260 may include at least one conventional processor or microprocessor that interprets and executes instructions. Memory 230 may be a random access memory (RAM) or another type of dynamic storage device that stores information and instructions for execution by processor 260. Memory 230 may also store temporary variables or other intermediate information used during execution of instructions by processor 260. ROM 240 may include a conventional ROM device or another type of static storage device that stores static information and instructions for processor 260.

Input device 220 may include a keyboard or other input device. Output device 250 may include one or more conventional mechanisms that output information, including one or more display screens, or other output devices.

Communication interface 280 may include a transceiver for transmitting and receiving information to or from network 108. Communication interface 280 may transmit and receive information via a wireless or wired connection.

Processing device 200 may perform such functions in response to processor 260 executing sequences of instructions contained in a tangible machine-readable medium, such as, for example, memory 230, ROM 240, or other medium. Such instructions may be read into memory 230 from another machine-readable medium or from a separate device via communication interface 280.

Exemplary Display Screens

FIGS. 3 and 4 illustrate exemplary display screens in an embodiment consistent with the subject matter of this disclosure. FIG. 3 shows display screen 300 including a displayed graphical object 306 and paragraphs 302, 304 of text in a source natural language. Paragraph 302 includes source language sentences 308, 310 and 312 and paragraph 304 includes source language sentences 314, 316, 318 and 320.

FIG. 4 illustrates exemplary display screen 300 during progressive rendering. In this embodiment, formatting of display screen 300 remains unchanged. Graphical object 306 continues to be displayed in a same position of display screen 300. Paragraph 302 includes target language sentences 322, 324 and 326, which replaced source language sentences 308, 310 and 312. Paragraph 304 remains unchanged because, in this example, source language sentences 314, 316, 318 and 320 have not yet been machine-translated.

Thus, in the exemplary embodiment illustrated by FIGS. 3 and 4, progressive display rendering may have no effect on a displayed layout or formatting. Further, source language sentences may be replaced with corresponding target language sentences as translations become available.

In some embodiments, translation requests may be submitted in order from a top of a displayed portion of a document to a bottom of the displayed portion of the document. Therefore, translations of text located at or near the bottom of the displayed document may be unnecessary and not requested if a user loses interest in the displayed document and causes a different document to be displayed before translations of the text located at or near the bottom of the displayed document may be requested.

Figure 5:
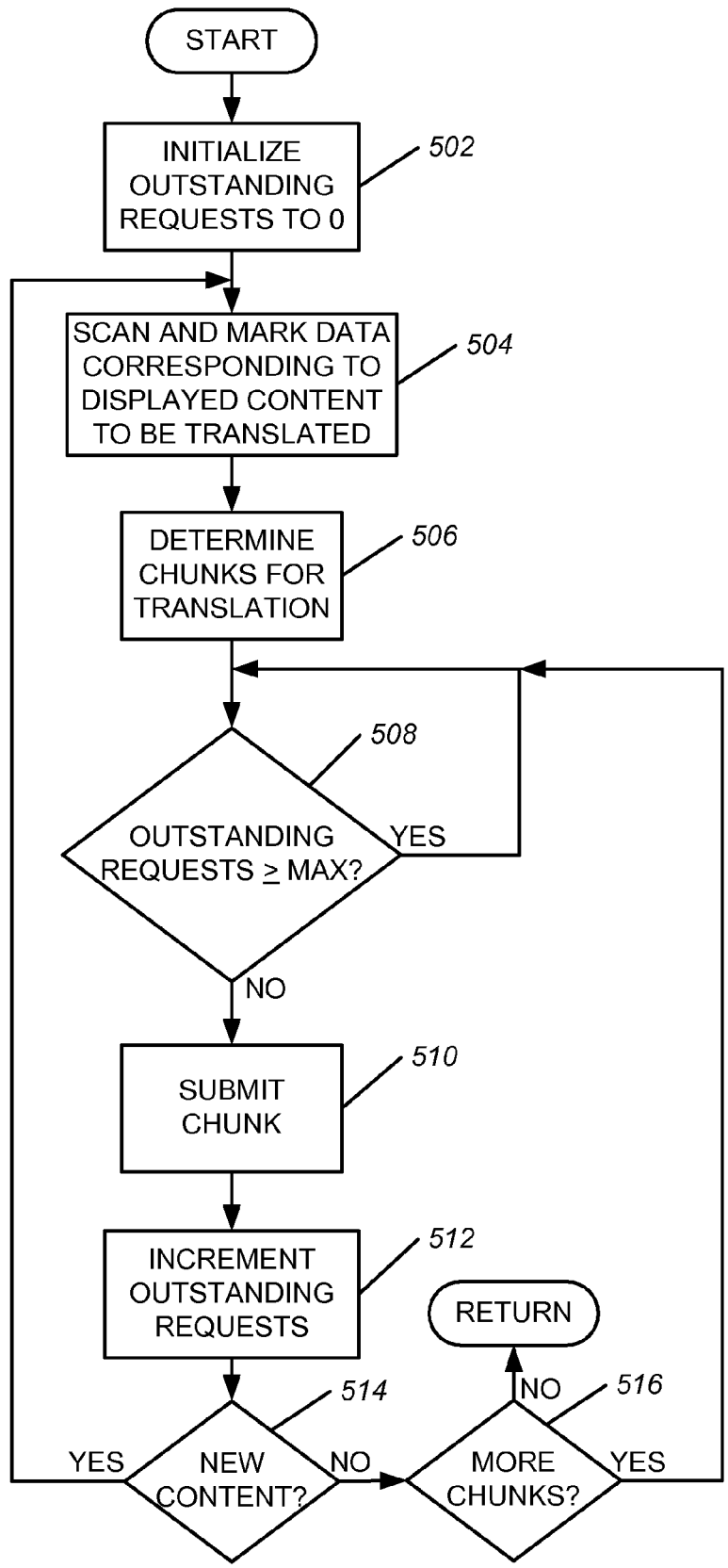
FIGS. 5 and 7 are flowcharts illustrating exemplary processes which may be performed in embodiments consistent with the subject matter of this disclosure.
Figure 7:
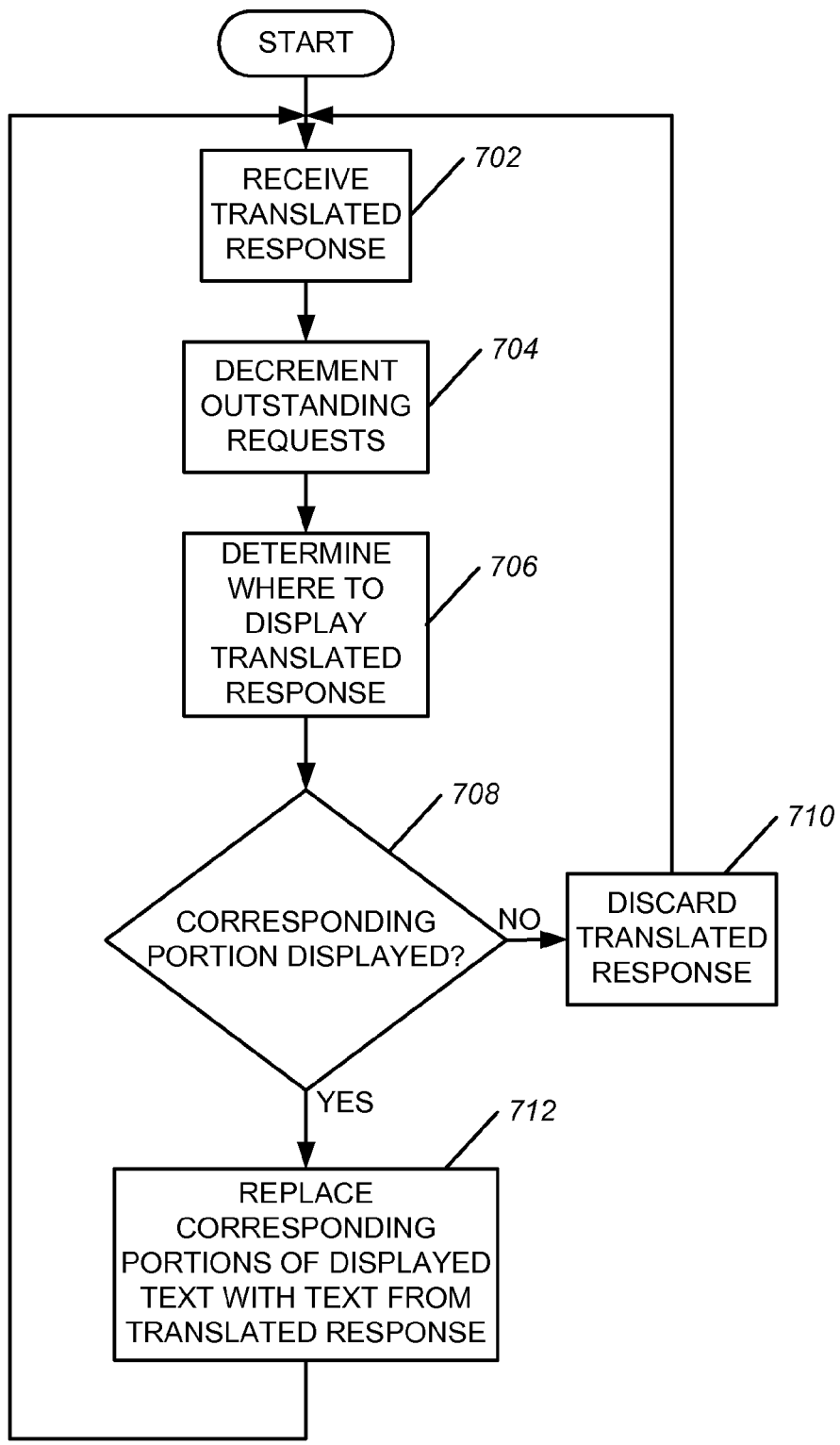

FIGS. 5 and 7 illustrate flowcharts of an exemplary process, which may be performed in embodiments consistent with the subject matter of this disclosure. The flowchart of FIG. 5 concerns the submission of translation requests of text in a source natural language. The flowchart of FIG. 7 concerns displaying of translated responses in a target natural language, corresponding to the submitted translation requests.

With respect to FIG. 5, the process may begin with a user processing device, such as, for example, processing device 102 or 104, initializing an outstanding request counter to zero (act 502). Because documents may contain information that is not to be translated, the processing device may scan data corresponding to a displayed document to mark portions of displayed content to be translated (act 504). As an example of documents including data not to be translated, HTML documents may include text, which is to be translated, as well as HTML commands, which are not to be translated.

Next, the processing device may determine chunks to be grouped for translation requests (act 506). A chunk may be textual content in a source natural language forming one or more complete sentences. In one embodiment, chunks may be formed from sentences in an order from a top of a document to a bottom of a document. In some embodiments, the processing device may optimize forming of chunks. For example, in one embodiment, the processing device may attempt to form chunks of approximately a same size. Thus, chunks may be formed from long and short sentences and may be formed from non-contiguous sentences. Each chunk may include information identifying the chunk, as well as information indicating a position of corresponding text on a display screen.

FIG. 6 illustrates an exemplary display screen 600 including text, upon which optimization, with respect to forming chunks of text, may be performed. Exemplary display screen 600 shows a first paragraph, including sentences 602, 604 and 608, and a second paragraph, including sentences 610, 612, 614, 616 and 618. Sentence 602 may include 144 characters, sentence 604 may include 126 characters, sentence 606 may include 15 characters, sentence 608 may include 150 characters, sentence 610 may include 26 characters, sentence 612 may include 94 characters, sentence 614 may include 30 characters, sentence 616 may include 80 characters, and sentence 618 may include 100 characters. In this example, the processing device may attempt to form chunks, including one or more of the sentences, having approximately 250 characters. In other embodiments, the processing device may attempt to form chunks having approximately a different number of characters. Thus, in this example, the processing device may form a first chunk, including sentences 602, 610 and 616 having a total length of 250 characters, a second chunk, including sentences 604, 612 and a 614 having a total length of 250 characters, a third chunk, including the sentences 608 and 618 having a total length of 250 characters, and a fourth chunk, including remaining sentence 606 having 15 characters.

Returning to FIG. 5, the processing device may determine whether the outstanding request counter is greater than or equal to a predetermined number, such as a maximum predetermined number (act 508). For example, in one embodiment, the maximum predetermined number may be 5, or another value. If the outstanding request counter is greater than or equal to the maximum predetermined number, then the processing device may not send any additional translation requests until the outstanding request counter drops below the maximum predetermined number.

If, during act 508, the processing device determines that the outstanding request counter is not greater than or equal to the maximum predetermined number, then the processing device may submit a translation request including a chunk (act 510). In some embodiments, the translation request may be submitted for translation to a server, or a group of servers, such as, for example, server 106, via a network, such as, for example, network 108. The translation request may be submitted asynchronously without regard as to whether a translation response is received regarding an immediately preceding submitted translation request. In one embodiment, including a web browser for displaying documents, translation requests may be submitted asynchronously using Asynchronous JavaScript and XML (AJAX) on HTML documents. In other embodiments, other techniques may be employed to submit translation requests asynchronously.

After submitting the chunk, the processing device may increment the outstanding request counter (act 512). The processing device may then determine whether new content is being displayed by the processing device (act 514). For example, in embodiments in which the processing device includes a browser, a different website may be displayed on a display screen of the processing device, or a different portion of a web page may be displayed on the display screen of the processing device. If the processing device determines that new content is displayed on the display screen, then the processing device may repeat acts 504-514.

If, during act 514, the processing device determines that new content is not being displayed by the processing device, then the processing device may determine whether any additional chunks remain to be submitted in a translation request (act 516). If no additional chunks remain, then the process may be completed. Otherwise, act 508-516 may be repeated.

FIG. 7 is a flowchart illustrating exemplary processing, with respect to received translated responses, in an embodiment of a processing device, such as, for example, processing device 102 or 104. The process may begin with the processing device receiving a translated response corresponding to a previously submitted translation request (act 702). In some embodiments, the translated response may be sent by a server, such as, for example, server 106, via a network, such as, for example, network 108. Each received translated response may include text in a target natural language corresponding to text in a source natural language included in a chunk submitted via a translation request. Further, each received translated response may include information indicating a corresponding chunk and a location of the corresponding chunk on a display.

After receiving the translated response, the processing device may decrement the outstanding request counter (act 704). The processing device may then examine the information included in the translated response indicating the corresponding chunk and the location of the corresponding chunk on the display in order to determine where on the display to present translated text from the translated response (act 706). The presented translated text may replace displayed corresponding text in the source natural language.

The processing device may then determine whether text corresponding to the received translated text is currently displayed (act 708). For example, the text may not be displayed if the document including the corresponding content is no longer displayed because the user requested a different document for display, or if a different portion of the document is being displayed. If the processing device determines that the text corresponding to the received translated text is not currently displayed, then the processing device may discard the translated response (act 710) and may repeat acts 702-708. Otherwise, the processing device may replace corresponding portions of displayed text in the source natural language with the translated text in the target natural language from the received translated response (act 712). The processing device may then repeat acts 702-712.

In another embodiment consistent with the subject matter of this disclosure, instead of submitting translation requests for machine translation, another type of processing request may be submitted and performed, such as, for example, a grammar checker request, or other processing request.

Figure 8:
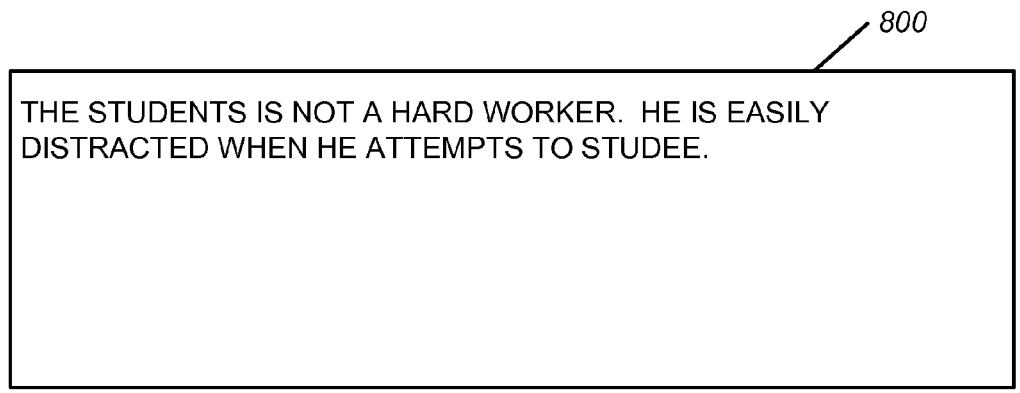
FIGS. 8 and 9 are exemplary display screens illustrating replacement of displayed text in other embodiments consistent with the subject matter of this disclosure.

For example, FIG. 8 illustrates an exemplary display 800, in which two sentences are displayed. The first sentence is, "The students is not a hard worker." The second sentence is, "He is easily distracted when he attempts to studee." The two sentences may be submitted for grammar checking processing, which may include spellchecking in some embodiments. Each of the processing requests may include a unit of text. In the grammar checking example, the unit may be one or more complete sentences, or another unit of text. Thus, for example, both sentences may be submitted in a single grammar checking request, or in separate grammar checking requests.

Figure 9:
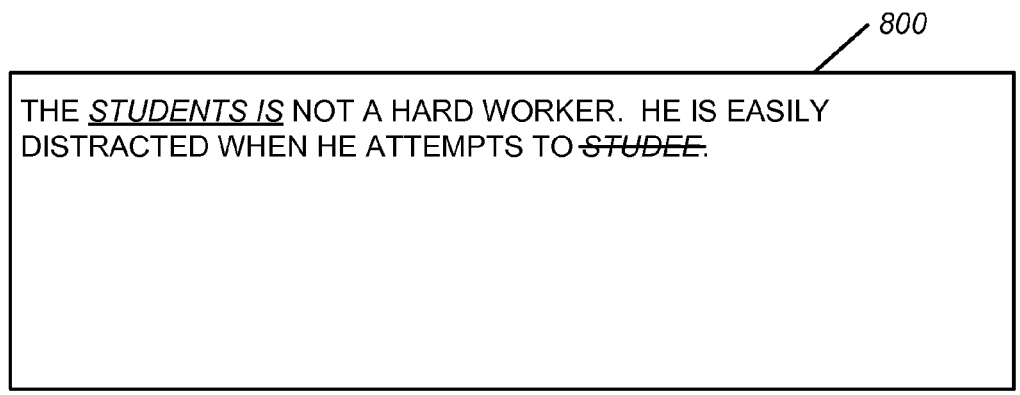

When processing responses are received, corresponding to the submitted grammar checking requests, the responses may include changed text or annotated text. For example, FIG. 9 illustrates exemplary display 800 after receiving processing responses corresponding to the submitted grammar checking requests. In FIG. 9, the first sentence, "The students is not a hard worker." was replaced with, "The students is not a hard worker." The phrase "students is" is underlined and italicized to indicate that the subject and verb of the sentence do not agree. With respect to the second sentence, "He is easily distracted when he attempts to studee." the word "studee" has a line a running through it to indicate a spelling error.

Figure 10:
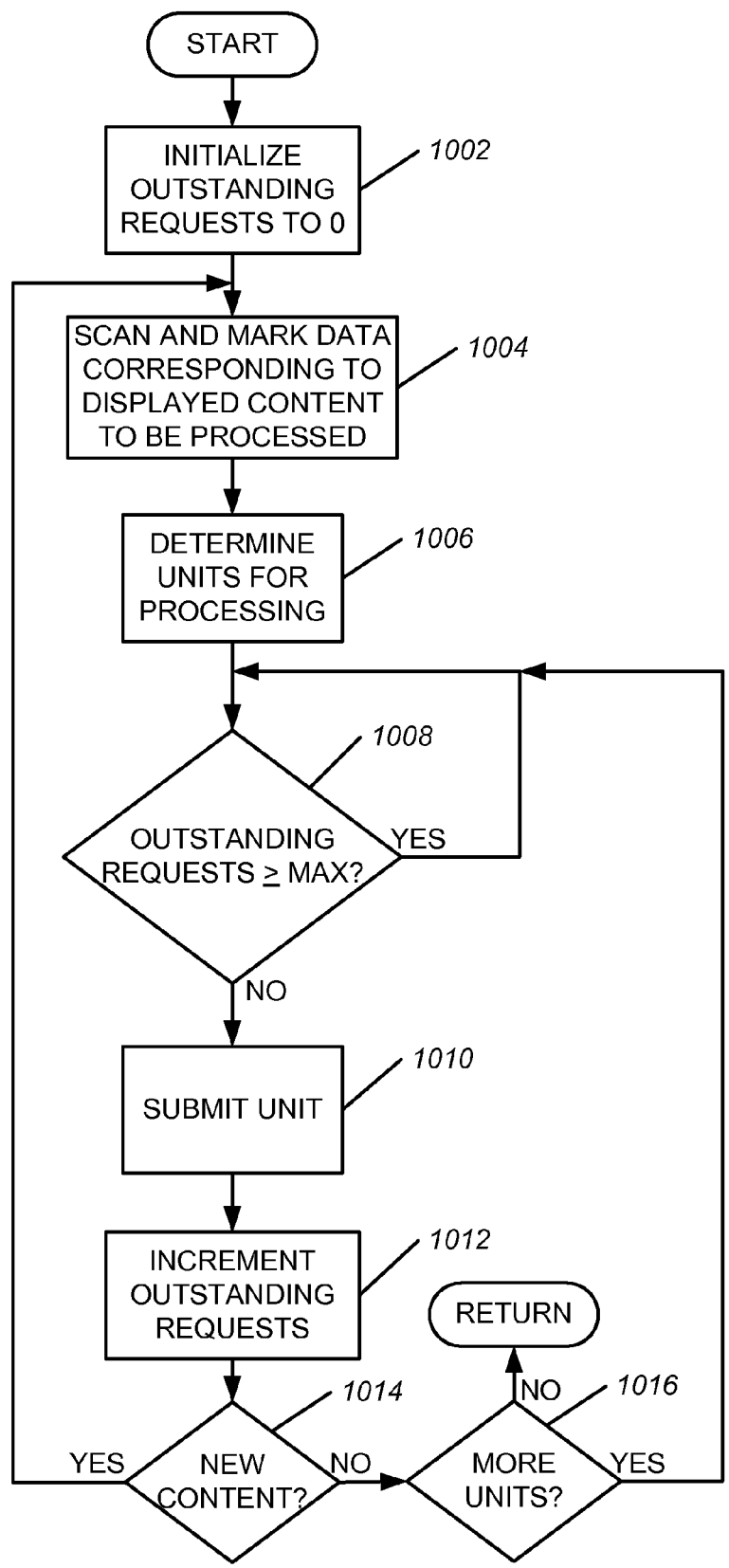
FIGS. 10 and 11 are flowcharts illustrating other exemplary processes which may be performed in embodiments consistent with the subject matter of this disclosure

FIG. 10 is a flowchart illustrating exemplary processing, which may be performed by a processing device in embodiments consistent with the subject matter of this disclosure. The flowchart of FIG. 10 concerns the submission of textual processing requests. The flowchart of FIG. 11 concerns displaying of information with respect to processing responses corresponding to the submitted processing requests.

With respect to FIG. 10, the process may begin with a user processing device, such as, for example, processing device 102 or 104, initializing an outstanding request counter to zero (act 1002). Because documents may contain information that is not to be processed, the processing device may scan data corresponding to a displayed document to mark portions of displayed content to be processed (act 1004). As an example of documents including data not to be translated, HTML documents may include text, which is to be processed, as well as HTML commands, which are not to be processed. The processing may include machine translation of text from a source natural language to a target natural language, grammar checking and/or spellchecking, or other processing of text.

Next, the processing device may determine units to be grouped for processing requests (act 1006). A unit may be a chunk, or other grouping of textual content for individual ones of the processing requests. The unit may include one or more complete sentences or other grouping of the textual content. In one embodiment, each of the submitted processing requests may include a respective unit in an order from a top of a displayed portion of a document to a bottom of the displayed portion of the document.

The processing device may determine whether the outstanding request counter is greater than or equal to a predetermined number, such as a maximum predetermined number (act 1008). In one embodiment, the maximum predetermined number may be 5, or another value. If the outstanding request counter is greater than or equal to the maximum predetermined number, then the processing device may not send any additional processing requests until the outstanding request counter drops below the maximum predetermined number.

If, during act 1008, the processing device determines that the outstanding request counter is not greater than or equal to the maximum predetermined number, then the processing device may submit a processing request including a unit of the textual content (act 1010). In some embodiments, the processing request may be submitted for processing to a server, or a group of servers, such as, for example, server 106, via a network, such as, for example, network 108. In other embodiments, the processing request may be submitted to a process executing in the processing device. The processing request may be submitted asynchronously without regard as to whether a processing response is received regarding an immediately preceding submitted processing request. In an embodiment including a web browser for displaying documents processing requests may be submitted asynchronously using Asynchronous JavaScript and XML (AJAX) on HTML documents. In other embodiments, other techniques may be employed to submit processing requests asynchronously.

After submitting the unit, the processing device may increment the outstanding request counter (act 1012). The processing device may then determine whether new content is being displayed by the processing device (act 1014). For example, in embodiments in which the processing device includes a browser, a different website may be displayed on a display screen of the processing device, or a different portion of a web page may be displayed on the display screen of the processing device. If the processing device determines that new content is displayed on the display screen, then the processing device may repeat acts 1004-1014.

If, during act 1014, the processing device determines that new content is not being displayed by the processing device, then the processing device may determine whether any additional units remain to be submitted in a processing request (act 1016). If no additional units remain, then the process may be completed. Otherwise, act 1008-1016 may be repeated.

Figure 11:
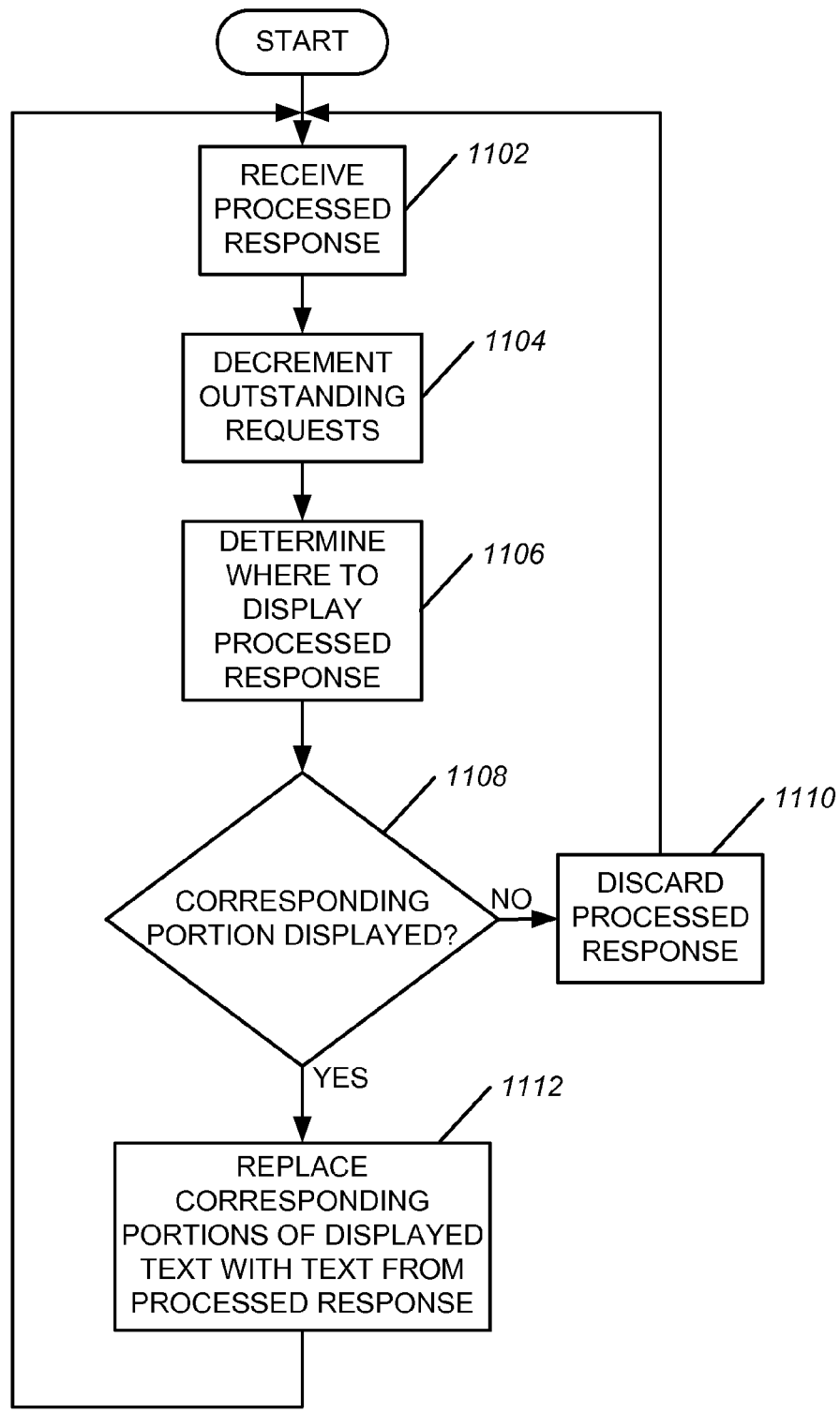

FIG. 11 is a flowchart illustrating an exemplary process, with respect to received processing responses, in an embodiment of a processing device, such as, for example, processing device 102 or 104. The process may begin with the processing device receiving a processing response corresponding to a previously submitted processing request (act 1102). The processing response may include changed or annotated text corresponding to a process, such as, for example, machine translation of textual content from a source natural language to a target natural language, grammar checking and/or spellchecking, or other processing. In some embodiments, the processing response may be sent by a server, such as, for example, server 106, via a network, such as, for example, network 108. Each received processing response may include text corresponding to text included in a unit of text submitted via a processing request. Further, each received processing response may include information indicating a corresponding unit of text and a location of the corresponding unit of text on a display screen.

After receiving the processing response, the processing device may decrement the outstanding request counter (act 1104). The processing device may then examine the information included in the processing response indicating the corresponding unit of text and the location of the corresponding unit of text on the display screen in order to determine where on the display screen to present processed text from the processing response (act 1106). The presented processed text may include changed or annotated text.

The processing device may then determine whether text corresponding to received processed text, included in a respective processing response, is currently displayed (act 1108). For example, the text may not be displayed if the document including the corresponding content is no longer displayed because the user requested a different document for display, or if a different portion of the document is being displayed. If the processing device determines that the text corresponding to the received processed text is not currently displayed, then the processing device may discard the processing response (act 1110) and may repeat acts 1102-1108. Otherwise, the processing device may replace corresponding portions of the displayed text with the processed text from the processing response (act 1112). The processing device may then repeat acts 1102-1112.

Miscellaneous

The above-mentioned embodiments illustrate a processing device submitting translation requests or processing requests, with respect to displayed textual content of a document, to one or more servers via a network and receiving corresponding processing responses from the one or more servers. Embodiments consistent with the subject matter of this disclosure are not limited to the above-mentioned illustrated embodiments. For example, in some embodiments, processing may be performed on a single processing device which displays textual content of a document. As an example, in an embodiment in which a browser executing on a processing device displays textual content on a display, the processing device may perform processing of the displayed textual content without submitting processing requests to another processing device via a network. In such an embodiment, the processing device may submit processing requests to a process executing on the processing device and may receive corresponding processing responses from the process, or from a second process.

Conclusion

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Although the above descriptions may contain specific details, they should not be construed as limiting the claims in any way. Other configurations of the described embodiments are part of the scope of this disclosure. Further, implementations consistent with the subject matter of this disclosure may have more or fewer acts than as described, or may implement acts in a different order than as shown. Accordingly, the appended claims and their legal equivalents should only define the invention, rather than any specific examples given.

We claim as our invention:

1. A method for performing progressive display rendering of machine-translated text, the method comprising:
   submitting a plurality of requests for translating displayed text of a displayed document from a source language to a target language, each of the plurality of requests including at least one sentence of text, and ones of the plurality of requests being submitted independently of receiving a corresponding response to an immediately preceding submitted request;
   receiving translated responses including text in the target language, each of the translated responses corresponding to a respective one of the submitted plurality of requests;
   determining whether text corresponding to respective received ones of the translated responses is currently being displayed; and
   replacing only portions of the displayed text in the source language with corresponding ones of the text included in the respective received ones of the translated responses as the respective ones of the translated responses are received, when the determining determines that the text corresponding to the respective received ones of the translated responses is currently being displayed, wherein
   the method is implemented by a processing device.

2. The method of claim 1, wherein a formatting of the displayed document remains unchanged.

3. The method of claim 1, wherein any graphical images included in the displayed document remain unchanged.

4. The method of claim 1, wherein no more than a predetermined number of the requests are outstanding at any one time.

5. The method of claim 1, wherein an order of submitting of the requests includes submission of first respective ones of the at least one sentence of text from a top of the displayed document before submission of second respective ones of the at least one sentence of text from a bottom of the displayed document.

6. The method of claim 1, wherein each of the requests for translating the displayed text include approximately a same amount of text.

7. The method of claim 1, further comprising optimizing an amount of text included in the submitted requests.

8. The method of claim 1, further comprises:
   optimizing an amount of text included in the submitted requests, wherein
   the optimizing of the amount of text included in the submitted requests further comprises mixing short sentences with long sentences.

9. A processing device comprising:
   at least one processor; and
   a memory connected to the at least one processor, the memory comprising:
   instructions for submitting a plurality of requests for processing displayed text, ones of the plurality of submitted requests being submitted independently of receiving a corresponding processing response to an immediately preceding submitted processing request;
   instructions for receiving respective processing responses including changed or annotated text corresponding to respective ones of the submitted plurality of requests;
   instructions for determining whether text corresponding to the respective received processing responses is currently being displayed;
   instructions for replacing only portions of the displayed text corresponding to the changed or annotated text in respective ones of the received processing responses as each of the respective ones of the received processing responses is received, when the determining determines that the text corresponding to the respective ones of the received processing responses is currently being displayed; and instructions for discarding the respective ones of the received processing responses as the respective ones of the received processing responses when the determining fails to determine that the text corresponding to the respective ones of the received processing responses is currently being displayed.

10. The processing device of claim 9, wherein the memory further comprises:
    instructions for scanning and marking data corresponding to the displayed text to be processed, and
    instructions for determining units of the displayed text, each of the submitted plurality of requests including a respective one of the units.

11. The processing device of claim 9, wherein:
    the processing of the displayed text includes performing grammar checking of the displayed text.

12. The processing device of claim 9, wherein:
    the displayed text includes text in a source natural language,
    the processing of the displayed text includes machine-translation of the displayed text from the source natural language to a target natural language, and
    the instructions for replacing only the portions of the displayed text corresponding to the received changed or annotated text as the processing responses are received comprise:
        instructions for replacing the displayed text in the source natural language with text in the target natural language included in corresponding received processing responses as the corresponding processing responses are received.

13. The processing device of claim 9, wherein:
    the displayed text includes text in a source natural language,
    the processing of the displayed text includes machine-translation of the displayed text from the source natural language to a target natural language, and
    each of the plurality of requests for processing displayed text includes one or more complete sentences.

14. The processing device of claim 9, wherein the memory further comprises:
    instructions for permitting no more than a predetermined number of the submitted plurality of requests to be outstanding.

15. A method for performing progressive display rendering of processed text, the method comprising:
    submitting a plurality of processing requests with respect to displayed text from a portion of a document displayed on a display screen of a processing device, each of the plurality of requests including a respective unit of the displayed text, ones of the plurality of submitted processing requests being submitted independently of receiving a corresponding processing response to an immediately preceding submitted processing request;
    receiving processing responses including changed or annotated text corresponding to respective ones of the submitted plurality of processing requests; and
    determining whether text corresponding to the changed or annotated text included in ones of the received processing responses is currently being displayed;
    replacing portions of the displayed text with the received changed or annotated text as the respective processing responses are received, only when the received changed or annotated text corresponds to text currently being displayed; and
    discarding the received changed or annotated text only when the received changed or annotated text fails to correspond to the text currently being displayed.

16. The method of claim 15, wherein a format of the portion of the document displayed on the display screen of the processing device remains unchanged.

17. The method of claim 15, wherein:
    each of the processing requests is a request for checking a grammar of the respective unit of the displayed text.

18. The method of claim 15, wherein no more than a predetermined number of processing requests are outstanding at any time.

19. The method of claim 15, wherein ones of the plurality of processing requests associated with ones of the displayed text from a top of the display screen are submitted before ones of the plurality of processing requests associated with ones of the displayed text from a bottom of the display screen.

20. The method of claim 15, wherein:
    each of the plurality of processing requests includes a request for machine-translation of the respective unit of the displayed text from a source natural language to a target natural language, and
    each of the received processing responses includes machine translated text in the target natural language, corresponding to a respective one of the plurality of processing requests.

* * * * *

UNITED STATES PATENT AND TRADEMARK OFFICE
CERTIFICATE OF CORRECTION

| | | |
|---|---|---|
| PATENT NO. | : 8,103,498 B2 | Page 1 of 1 |
| APPLICATION NO. | : 11/865284 | |
| DATED | : January 24, 2012 | |
| INVENTOR(S) | : Andreas Bode et al. | |

It is certified that error appears in the above-identified patent and that said Letters Patent is hereby corrected as shown below:

In column 12, line 11, in Claim 15, after "requests;" delete "and".

Signed and Sealed this
Thirteenth Day of March, 2012

David J. Kappos
*Director of the United States Patent and Trademark Office*